Jan. 10, 1967   J. J. GUMBLETON   3,296,647
WINDSHIELD WIPER BLADE WITH WASHER ATTACHMENT
Filed July 10, 1964
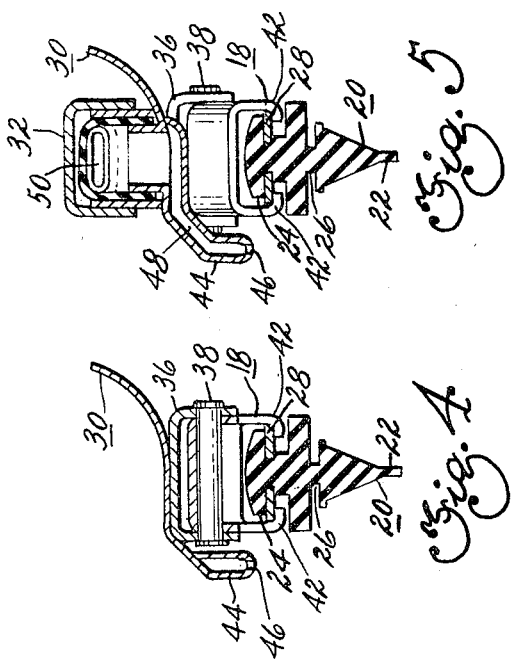
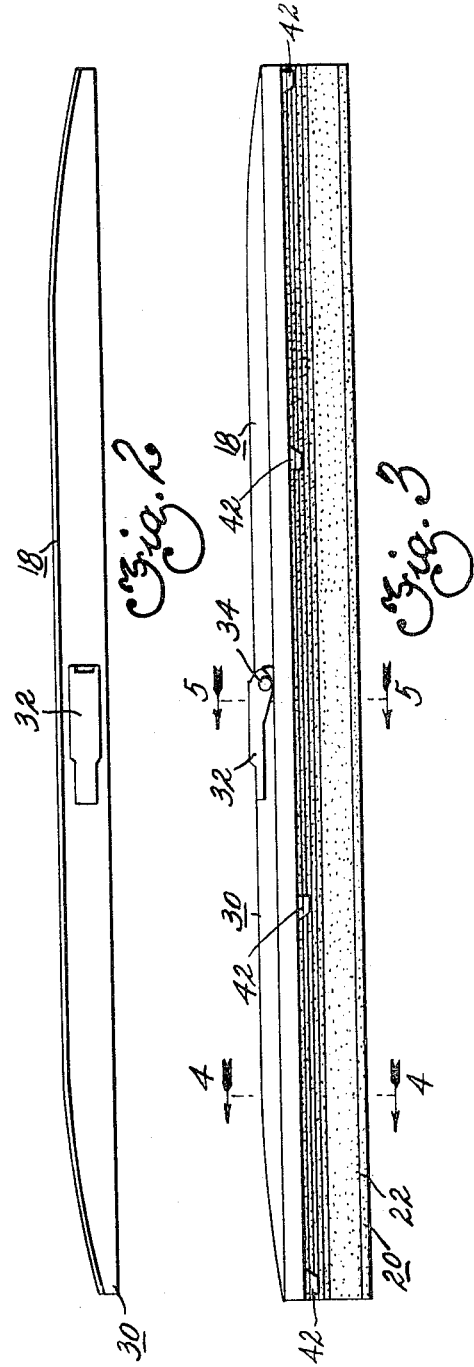
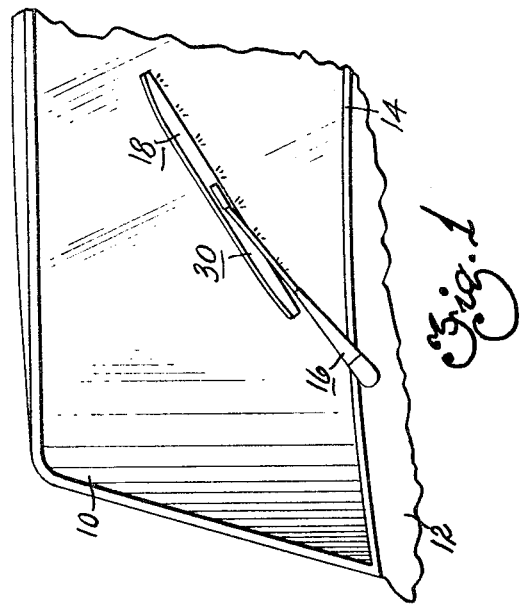
INVENTOR.
JAMES J. GUMBLETON
BY
HIS ATTORNEY United States Patent Office 3,296,647
Patented Jan. 10, 1967

3,296,647
WINDSHIELD WIPER BLADE WITH WASHER ATTACHMENT
James J. Gumbleton, Troy, Mich., assignor to General Motors Corporation, Detroit, Mich., a corporation of Delaware
Filed July 10, 1964, Ser. No. 381,629
5 Claims. (Cl. 15—250.04)

This invention pertains to the art of windshield cleaning, and particularly to an improved wiper blade assembly having a washer attachment.

Substantially all motor vehicles manufactured today are equipped with a windshield cleaning system comprising a pair of ocillatable wiper blades carried by arms and a washer for delivering liquid solvent onto the windshield into the paths of movement of the wiper blades thereacross so as to remove vision-obscuring material therefrom. The effectiveness of current windshield systems is marginal during high speed driving conditions due to the fact that the liquid solvent is normally delivered from stationary nozzles mounted on the vehicle cowl beneath the windshield, and the delivery pressure of the liquid solvent is not sufficient to prevent rapid dispersion and dissipation when subjected to high wind velocity, particularly cross winds. As the result, little, if any, of the liquid solvent will be delivered to the windshield into the path of movement of the wiper blades, and in addition, the wiper blades have a tendency to lift due to wind thereby further impairing the effectiveness of the windshield cleaning system.

The present invention relates to a windshield wiper blade having a washer attachment wherein the liquid solvent is discharged in close proximity to the windshield and in advance of the movement of the wiper blades thereacross so as to produce a cleaning system which is effective under all driving conditions. Accordingly, among my objects are the provision of an improved windshield cleaning system including a wiper and a washer which is capable of effectively cleaning the windshield under all driving conditions; the further provision of an improved anti-wind lift wiper blade assembly having a liquid distributor tube extending longitudinally therealong; and the still further provision of a wiper blade assembly of the aforesaid type including a wind deflecting member of airfoil cross section such that cross winds produce a force component which assists the wiper arm spring in maintaining the wiper blade in contact with the windshield and wherein the airfoil deflector includes a washer distributor tube through which liquid solvent can be delivered onto the windshield in advance of the movement of the wiper blades thereacross.

The aforementioned and other objects are accomplished in the present invention by locating the distributor tube along the bottom edge of the airfoil deflector, and wherein the washer pump is actuated in timed relation with movement of the wiper blades across the windshield so as to deliver liquid solvent during the inboard, or downward, stroke of the wiper blades, and hence in advance of the movement of the wiper blades.

Further objects and advantages of the present invention will be apparent from the following description, reference being had to the accompanying drawing, wherein a preferred embodiment of the present invention is clearly shown.

In the drawing:
FIGURE 1 is a fragmentary view in elevation of a portion of a motor vehicle having the improved windshield cleaning system.
FIGURE 2 is a plan view of the improved wiper blade assembly.

FIGURE 3 is a side view of the improved wiper blade assembly.
FIGURES 4 and 5 are enlarged sectional views taken along lines 4—4 and 5—5 respectively, of FIGURE 3.

Referring to FIGURE 1, a portion of a motor vehicle is shown having a windshield 10 with a forwardly extending cowl 12 disposed therebeneath and a reveal molding 14 surrounding the windshield. It is to be understood that in accordance with conventional practice the vehicle is equipped with a pair of wiper arms and blades which may be oscillatable across the outer surface of the windshield in phase opposition. Only one wiper arm 16 is shown, this arm comprising spring hinge connected inner and outer sections, the outer arm section being detachably connected to a wiper blade assembly 18. It is to be understood that the outer section of the arm 16 is biased toward the windshield by the spring hinge connection so as to maintain the wiper blade in engagement with the windshield.

Referring to FIGURES 2 through 4, the improved wiper blade assembly comprises an elastomeric squeegee 20 having a wiping lip 22 along one edge and a retention portion 24 along the opposite edge, the two portions of the squeegee being connected by a relatively thin neck 26 which permits flexing therebetween so as to permit the squeegee to assume the proper drag angle as it is moved across the windshield 10. The retention portion 24 is notched to receive a flexible metal backing strip 28 of conventional design, which backing strip is substantially freely flexible in a plane normal to the surface of the windshield while being substantially rigid in a plane parallel thereto.

The pressure applying superstructure of the wiper blade assembly 18 comprises a wind deflector 30 having an airfoil cross section as seen in FIGURES 4 and 5. The wind deflector 30 is longitudinally coextensive with the wiper blade 18. The airfoil cross section may be of the type disclosed in United States Patent 3,037,233 and is designed such that air flowing across the airfoil section will produce a downward force which assists the spring biased wiper arm in maintaining the wiper blade in contact with the windshield. The wind deflector 30 has a conventional wiper arm connector 32 connected thereto by a transverse hinge pin 34. The wind deflector 30 is welded, or otherwise permanently attached, to a primary yoke 36 which is hingedly connected at opposite ends by transversely extending pins 38 to a pair of secondary yokes. It is to be understood that this triple yoke pressure applying superstructure is only exemplary. The ends 42 of the secondary yokes have lost motion connections with the backing strip 28 so as to permit conformance of the squeegee assembly comprising the squeegee 20 and the backing strip 28 to surfaces of varying curvature.

The inboard edge of the wind deflector 30 is formed as a distributor tube 44 having closed ends and a plurality of longitudinally spaced apart spray orifices 46 in its lower edge through which liquid solvent is sprayed onto the windshield in a manner to be described. As seen particularly in FIGURE 5, the distributor tube 44 is connected by integral passage means 48 in the wind deflector 38 to a supply conduit 50 located within the connector 32. This supply conduit 50 may extend underneath the outer arm section, and be connected by a flexible coupling to another conduit in the inner arm section and thence through a hollow pivot shaft to the washer pump, not shown, all in a manner well known in the art.

In addition to the liquid distributor tube and conduits for supplying liquid solvent which are carried by the wiper arm and wiper blade assembly, the washer system comprehends a pump which may be driven by the wiper motor and intermittently actuated so as to deliver liquid solvent on only the inboard wiper strokes, that is during movement of the wiper blade and arm assemblies towards the lower reveal molding of the windshield so that liquid solvent will be discharged only in advance of the wiper blades during their downward movement. A suitable pump arrangement for delivering liquid solvent in this manner is disclosed and claimed in copending application Serial No. 46,922, filed August 2, 1960, in the name of Leo E. Bischoff, of common assignee.

Accordingly, it will be appreciated that when the wiper blades and arms are oscillated across the outer surface of the windshield 10, and the washer is activated, liquid solvent will be sprayed onto the windshield in advance of the movement of the wiper blades during their inboard strokes. By virtue of the liquid distributor being integral with the airfoil deflector 30, high velocity cross winds will neither lift the wiper blade from the windshield nor disperse the liquid solvent so as to reduce the effectiveness of the windshield cleaning system. Tests have indicated that the cleaning system is fully effective at driving speeds up to seventy miles an hour notwithstanding cross winds.

While the embodiment of the invention as herein disclosed constitutes a preferred form, it is to be understood that other forms might be adopted.

What is claimed is as follows:

1. In a windshield cleaning system for a motor vehicle having a wiper blade movable back and forth across the surface of the windshield and a washer pump for delivering liquid solvent under pressure only during a predetermined portion of the oscillatory stroke of said wiper blade, the improvement of which comprises, a wind deflector of airfoil cross section attached to said wiper blade and having a liquid distributor tube along the inboard edge thereof with a plurality of longitudinally spaced spray orifices facing said windshield, and means interconnecting said washer pump and said liquid distributor tube for delivering liquid solvent to said tube from which it is sprayed onto said windshield in advance of the movement of said wiper blade during the inboard stroke thereof.

2. In a windshield cleaning system for a motor vehicle having a wiper blade oscillatable back and forth across the surface of a windshield and a washer pump for delivering liquid solvent under pressure in timed relation only during a predetermined portion of the oscillatory stroke of said wiper blade, the improvement of which comprises, a wind deflector of airfoil cross section attached to said wiper blade and substantially longitudinally coextensive therewith, said wind deflector having an integral liquid distributor tube along its inboard edge with a plurality of longitudinally spaced apart spray orifices facing said windshield, and conduit means interconnecting said washer pump and said liquid distributor tube for delivering liquid solvent to said tube from which it is sprayed onto said windshield only in advance of the movement of said wiper blade during the inboard stroke thereof.

3. A wiper blade assembly including, an elongate squeegee comprising a flexible squeegee having a wiping lip along one edge and a retention portion along the opposite edge, a pressure applying superstructure connected at longitudinally spaced points to said retention portion, a wind deflector of airfoil cross section attached to said pressure applying superstructure, said wind deflector having a liquid distributor tube along its inboard edge with a plurality of longitudinally spaced apart spray orifices therein, and conduit means for supplying pressurized liquid solvent to said distributor tube for delivery through said spray orifices onto a surface to be cleaned.

4. A wiper blade assembly including, an elongate squeegee comprising a flexible squeegee having a wiping lip along one edge and a retention portion along the opposite edge, a pressure applying superstructure connected to said retention portion at longitudinally spaced apart points comprising a plurality of relatively movable members, a wind deflector of airfoil cross section attached to said pressure applying superstructure, said deflector having a liquid distributor tube along its inboard edge with a plurality of longitudinally spaced apart spray orifices therein, and coupling means for supplying pressurized liquid solvent to said distributor tube for delivery through said spray orifices onto a surface to be cleaned.

5. A wiper blade assembly including, an elongate squeegee comprising a freely flexible elastomeric body having a wiping lip along one edge and a retention portion along the opposite edge, a flexible backing strip attached to said retention portion, a pressure applying superstructure connected at longitudinally spaced points to said backing strip, a wind deflector of airfoil cross section attached to said superstructure, said wind deflector being longitudinally coextensive with said wiper blade and having an integral liquid distributor tube along its inboard edge with a plurality of longitudinally spaced apart spray orifices therein, and coupling means for supplying liquid solvent under pressure to said distributor tube for discharge through said spray orifices onto a surface to be cleaned.

References Cited by the Examiner

UNITED STATES PATENTS 2,059,224 11/1936 French _____ 15—250.04
2,910,715 11/1959 Ohrt _____ 15—250.04

FOREIGN PATENTS 1,328,616 4/1963 France.

CHARLES A. WILLMUTH, *Primary Examiner.*